(12) United States Patent
Ike

(10) Patent No.: US 9,097,591 B2
(45) Date of Patent: Aug. 4, 2015

(54) INKJET PRINTING APPARATUS AND DETECTION METHOD

(71) Applicant: CANON KABUSHIKI KAISHA, Tokyo (JP)

(72) Inventor: Takeshi Ike, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/224,496

(22) Filed: Mar. 25, 2014

(65) Prior Publication Data

US 2014/0292891 A1 Oct. 2, 2014

(30) Foreign Application Priority Data

Mar. 27, 2013 (JP) ................................. 2013-067127

(51) Int. Cl.
| | |
|---|---|
| *B41J 29/393* | (2006.01) |
| *G01K 7/16* | (2006.01) |
| *B41J 2/045* | (2006.01) |
| *B41J 2/165* | (2006.01) |
| *B41J 2/05* | (2006.01) |

(52) U.S. Cl.
CPC .................. *G01K 7/16* (2013.01); *B41J 2/0451* (2013.01); *B41J 2/04563* (2013.01); *B41J 2/16579* (2013.01); *B41J 2/05* (2013.01)

(58) Field of Classification Search
CPC .. B41J 2/04563; B41J 2/0454; B41J 2/04565; B41J 2/0452
See application file for complete search history.

(56) References Cited

U.S. PATENT DOCUMENTS

| | | | |
|---|---|---|---|
| 8,733,876 B2 | 5/2014 | Ike | |
| 2007/0291066 A1 * | 12/2007 | Takabayashi et al. | .......... 347/17 |
| 2012/0249654 A1 * | 10/2012 | Yamashita | ...................... 347/17 |
| 2013/0135381 A1 | 5/2013 | Ike | |

FOREIGN PATENT DOCUMENTS

JP 2008-023987 A 2/2008

* cited by examiner

*Primary Examiner* — Geoffrey Mruk
(74) *Attorney, Agent, or Firm* — Fitzpatrick, Cella, Harper & Scinto

(57) ABSTRACT

An inkjet printing apparatus includes a current source configured to be able to supply, to a resistance sensor, a constant current of the first constant current value and a constant current of the second constant current value larger than the first constant current value. A change of the resistance value of the resistance sensor is detected by switching the value of the constant current to be supplied to the resistance sensor between the first constant current value and the second constant current value a predetermined time after driving a heater to discharge an ink droplet.

8 Claims, 12 Drawing Sheets

100

FOR 4.5 mA

FOR 3.0 mA

F I G. 18
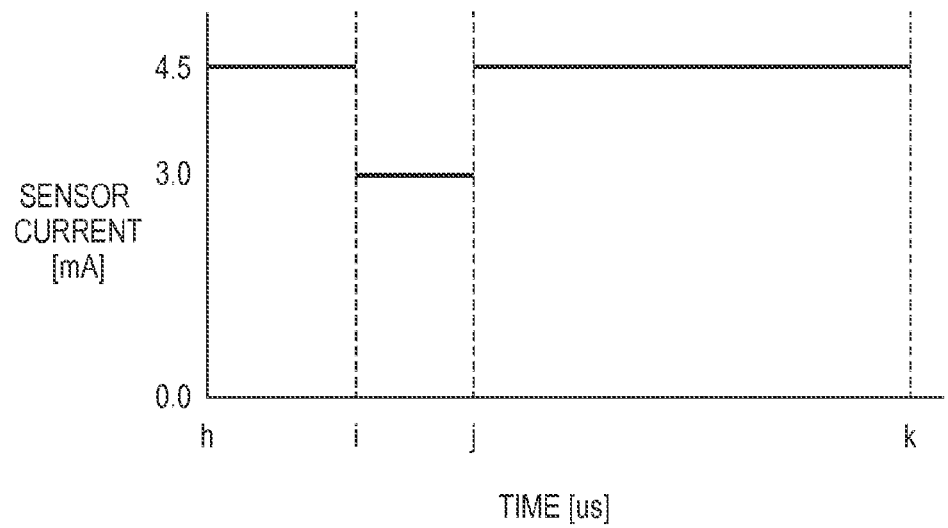
F I G. 19
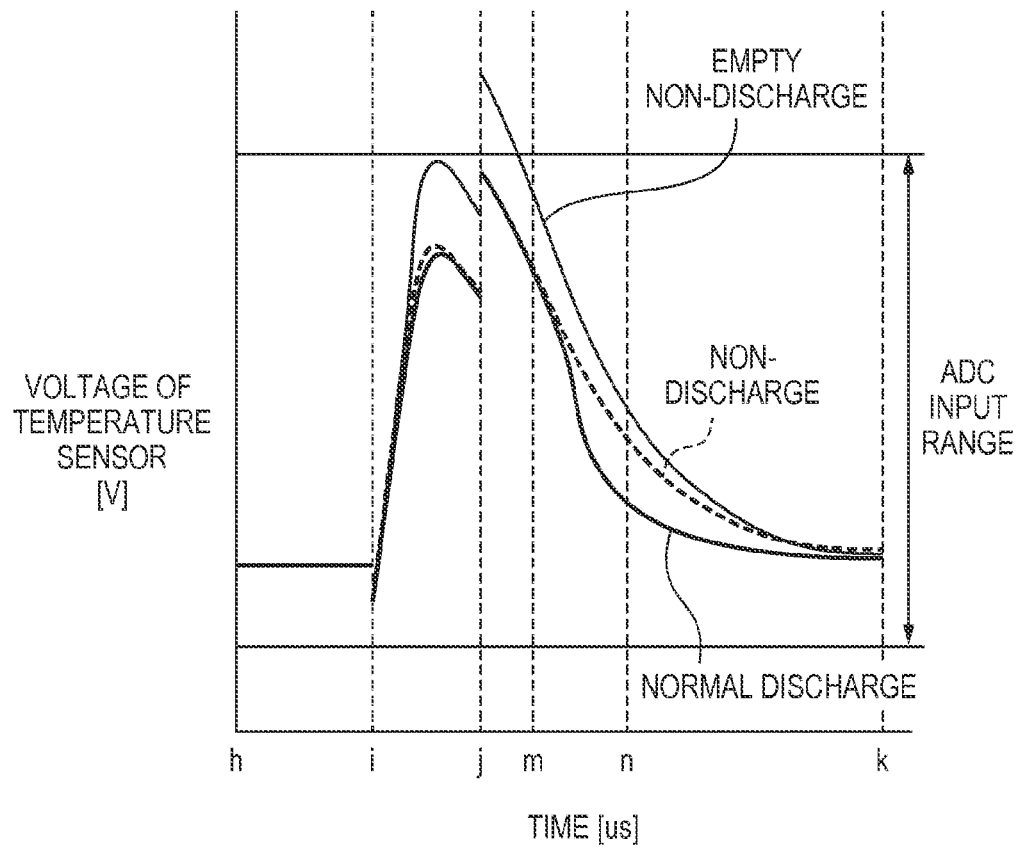

INKJET PRINTING APPARATUS AND DETECTION METHOD

BACKGROUND OF THE INVENTION

1. Field of the Invention

The present invention relates to an inkjet printing apparatus and detection method for detecting the discharge state of a nozzle.

2. Description of the Related Art

In an inkjet printing apparatus which prints by discharging ink droplets from orifices and adhering them to a printing medium such as paper or a plastic film, the printhead includes heaters configured to generate heat energy for discharging ink. An electrothermal transducer which generates heat in accordance with energization, a driving circuit, and the like can be formed by a step similar to a semiconductor manufacturing process. High-density mounting of nozzles is easy, and high-resolution printing can be implemented.

However, a discharge failure may occur in all or some nozzles of the printhead owing to clogging of a nozzle by a foreign substance, highly viscous ink, or the like, a bubble entering the ink supply path or nozzle, a change of the wettability of the nozzle surface, or the like. To prevent degradation of the image quality when such a discharge failure occurs, it is important to quickly execute a recovery operation of recovering the discharge state of a nozzle, and a complementary operation using another nozzle or the like. However, to quickly perform these operations, the discharge state and generation of a discharge failure need to be determined at high accuracy.

Japanese Patent Laid-Open No. 2008-23987 discloses a method of detecting a temperature drop generated in normal discharge in order to detect a discharge failure. In normal discharge, a point (temperature drop rate change point) appears, at which the temperature drop rate changes a predetermined time after the detected temperature reaches a maximum temperature. However, when a discharge failure occurs, this point does not appear. Based on the difference in temperature waveform, the ink discharge state is determined. A detector which detects the temperature is arranged below a heater which generates heat energy for discharge. By supplying a constant current to a resistor serving as the detector, a change of the resistance value upon a change of the temperature is output as a voltage value.

However, in Japanese Patent Laid-Open No. 2008-23987, the temperature drop rate change point necessary to detect a discharge state arises from contact of a small amount of ink upon normal discharge. Thus, a change of the signal at the temperature drop rate change point is very small. If the entire temperature waveform which changes upon applying energy to the heater is designed to fall within the input range of a subsequent A/D converter (ADC), the small signal change at the temperature drop rate change point becomes smaller. Such a small change is highly likely to be buried in noise or the like, and it becomes very difficult to determine the discharge state.

SUMMARY OF THE INVENTION

An aspect of the present invention is to eliminate the above-mentioned problems with the conventional technology. The present invention provides an inkjet printing apparatus and detection method for detecting a temperature change of a heater at high accuracy.

The present invention in one aspect provides an inkjet printing apparatus comprising: a printhead including a heater configured to discharge an ink droplet from a nozzle, and a resistance sensor whose resistance value changes upon a temperature change of the heater; a current source configured to be able to supply, to the resistance sensor, a constant current of a first constant current value and a constant current of a second constant current value larger than the first constant current value; and a detection unit configured to detect a change of the resistance value of the resistance sensor by switching a value of the constant current to be supplied to the resistance sensor between the first constant current value and the second constant current value a predetermined time after driving the heater to discharge the ink droplet.

According to the present invention, a temperature change of a heater can be detected at high accuracy.

Further features of the present invention will become apparent from the following description of exemplary embodiments with reference to the attached drawings.

BRIEF DESCRIPTION OF THE DRAWINGS

FIG. 18 is a graph showing a temporal change of the sensor current value supplied to the temperature sensor; and FIG. 19 is a graph showing a change of the output voltage of the temperature sensor at each sensor current in FIG. 18.

DESCRIPTION OF THE EMBODIMENTS

Figure 1:
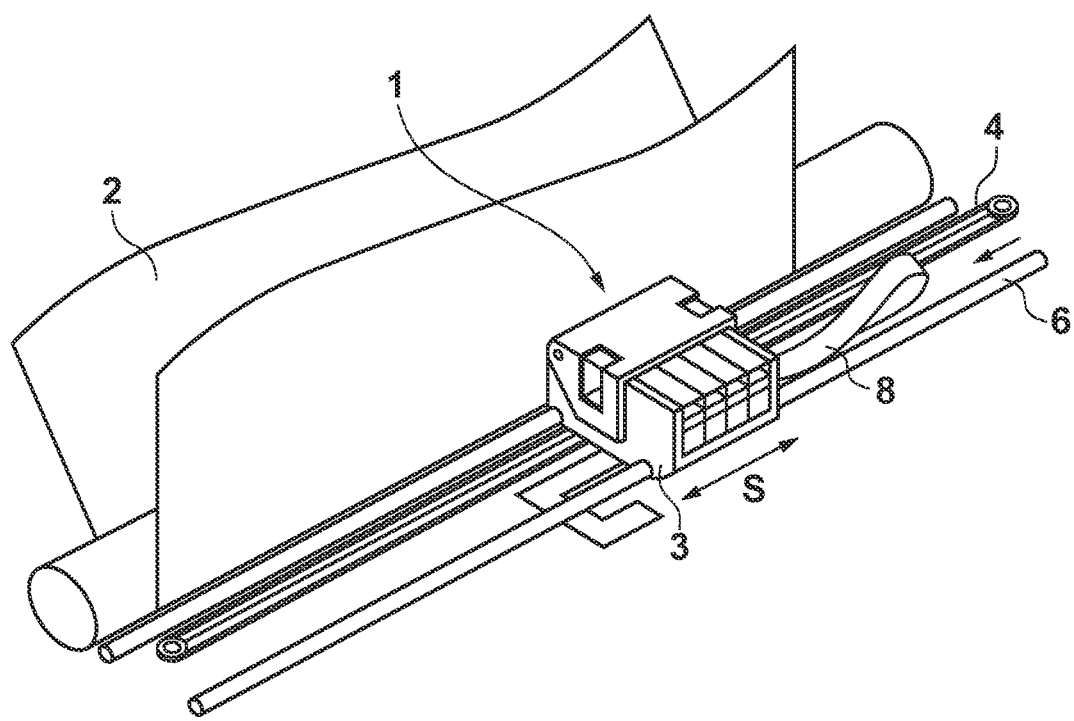
FIG. 1 is a view showing an arrangement around the printhead of an inkjet printing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

[First Embodiment]

FIG. 1 is a view showing an arrangement around the printhead of an inkjet printing apparatus 100 in the first embodiment. A printhead 1 is mounted on a carriage 3. The carriage 3 is guided and supported to be reciprocal in scanning directions indicated by an arrow S along a guide rail 6 in accordance with the turn of a timing belt 4. The printhead 1 includes, on a surface opposing a printing medium 2, a nozzle array extending in a direction perpendicular to the moving direction of the carriage 3. While the carriage 3 and printhead 1 move in the directions indicated by the arrow S, ink droplets are discharged from the nozzle array of the printhead 1 based on print data, thereby printing on the printing medium 2. The printing medium 2 is conveyed in the direction perpendicular to the scanning direction of the carriage 3. Printing on the entire surface of the printing medium 2 is possible by repeating the scan & ink droplet discharge operation and conveyance operation.

The printhead 1 can discharge ink droplets of a plurality of colors, for example, ink droplets of cyan (C), magenta (M), yellow (Y), and black (Bk). Ink tanks which store inks may be integrated with the printhead 1 to be separable. It is also possible to supply ink to the printhead 1 via a tube or the like from an ink tank arranged at a fixed portion of the inkjet printing apparatus 100. The carriage 3 includes an electrical connection for transferring, to the printhead 1, a driving signal or the like transmitted from a control board (not shown) on the main body side via a flexible cable 8 and a connector (not shown).

Although not shown in FIG. 1, a recovery device used to maintain the ink discharge operation of the nozzles of the printhead 1 in a satisfactory state or recover it may be arranged at a portion outside the printing range for the printing medium 2 within the moving range of the printhead 1. The recovery device includes, for example, a cap which caps the nozzle formation surface of the printhead, and a pump which forcibly discharges ink from the nozzles into the cap by applying a negative pressure in the capping state. The cap is used in the discharge operation (preliminary discharge) of ink which does not contribute to printing of a printing target such as an image.

Figure 2A:
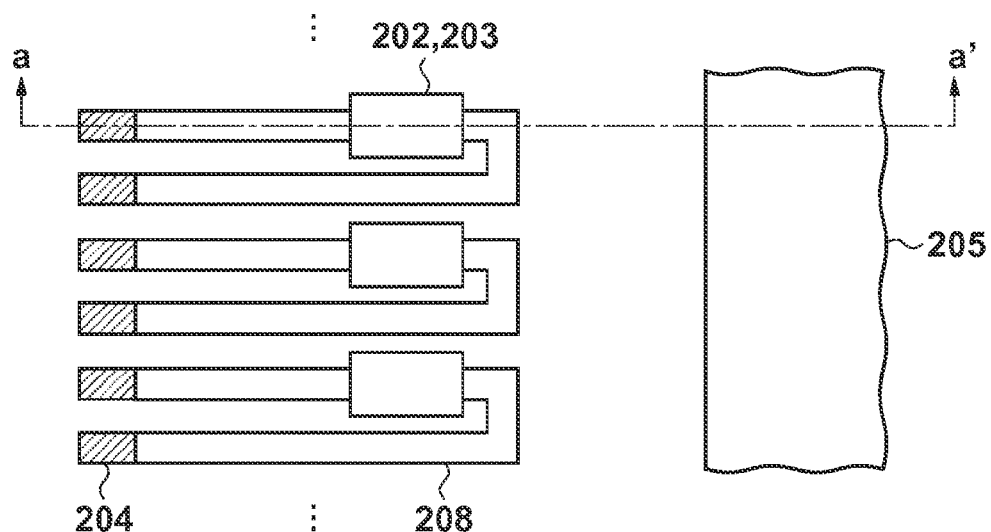
FIGS. 2A and 2B are views showing part of a heater board on the printhead including temperature detection elements.
Figure 2B:
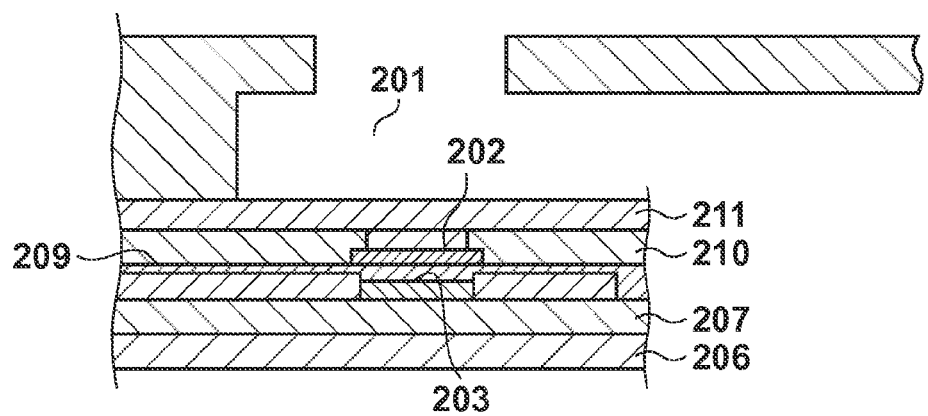

FIGS. 2A and 2B are views showing part of a heater board on the printhead 1 including temperature detection elements. FIG. 2A schematically shows the arrangement of part of the heater board. FIG. 2B schematically shows a section taken along a line a-a' in FIG. 2A. Electrothermal transducers (discharge heaters) 202 are heated in accordance with supply power (driving signal) to cause film boiling in ink. As a result, respective arrayed nozzles 201 can discharge ink droplets. Power for heating by the discharge heaters 202 is supplied via terminals 204. The terminals 204 are connected to the outside of the heater board by wire bonding. Temperature detection elements (temperature sensors) 203 are formed on the heater board by the same deposition process as that for the discharge heaters 202.

As shown in FIG. 2B, a resistance sensor formed from a thin-film resistor whose resistance value changes in accordance with the temperature, such as Al, Pt, Ti, Ta, Cr, W, or AlCu, is arranged on a heat accumulation layer 207 made of a thermal oxide film of $SiO_2$ or the like on an Si substrate 206 forming the heater board. The temperature sensor 203 in the embodiment is the resistance sensor. Further, an interconnection 208 of Al or the like including an individual interconnection for the discharge heater 202, the discharge heater 202, and an interconnection connected to a control circuit for selectively supplying power to the discharge heater 202 is formed on the Si substrate 206. Further, the discharge heater 202, a passivation film 210 of SiN or the like, and an anti-cavitation film 211 are stacked on an interlayer dielectric film 209 at high density by a process similar to a semiconductor manufacturing process. Note that Ta or the like is used for the anti-cavitation film 211 in order to enhance the cavitation resistance on the discharge heater 202.

Figure 3:
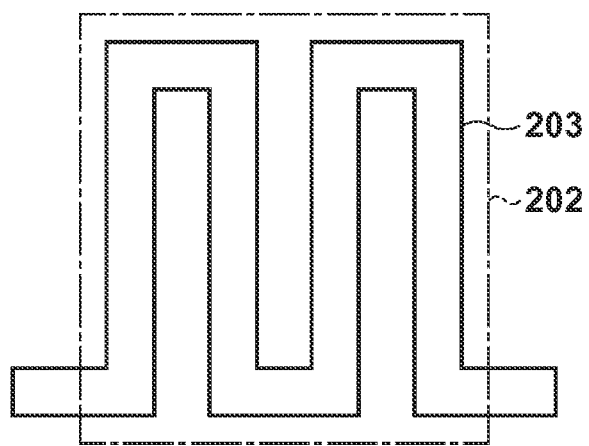
FIG. 3 is a view showing an example of the shape of a temperature sensor.

The temperature sensors 203 each formed as a thin-film resistor are arranged immediately below the corresponding discharge heaters 202 to be independently separated and be equal in number to the discharge heaters 202. The discharge heater 202 corresponding to each temperature sensor 203 is constituted as part of the interconnection 208. This arrangement can prevent upsizing of the structure. The planar shape of the temperature sensor 203 may be determined appropriately. For example, as shown in FIG. 2A, the planar shape of the temperature sensor 203 may be a rectangular shape having the same dimensions as those of the discharge heater 202, or a meandering shape as shown in FIG. 3. The meandering shape as shown in FIG. 3 can increase the resistance of the temperature sensor 203. A detection value can be obtained even from a small temperature fluctuation at high accuracy.

Figure 4:
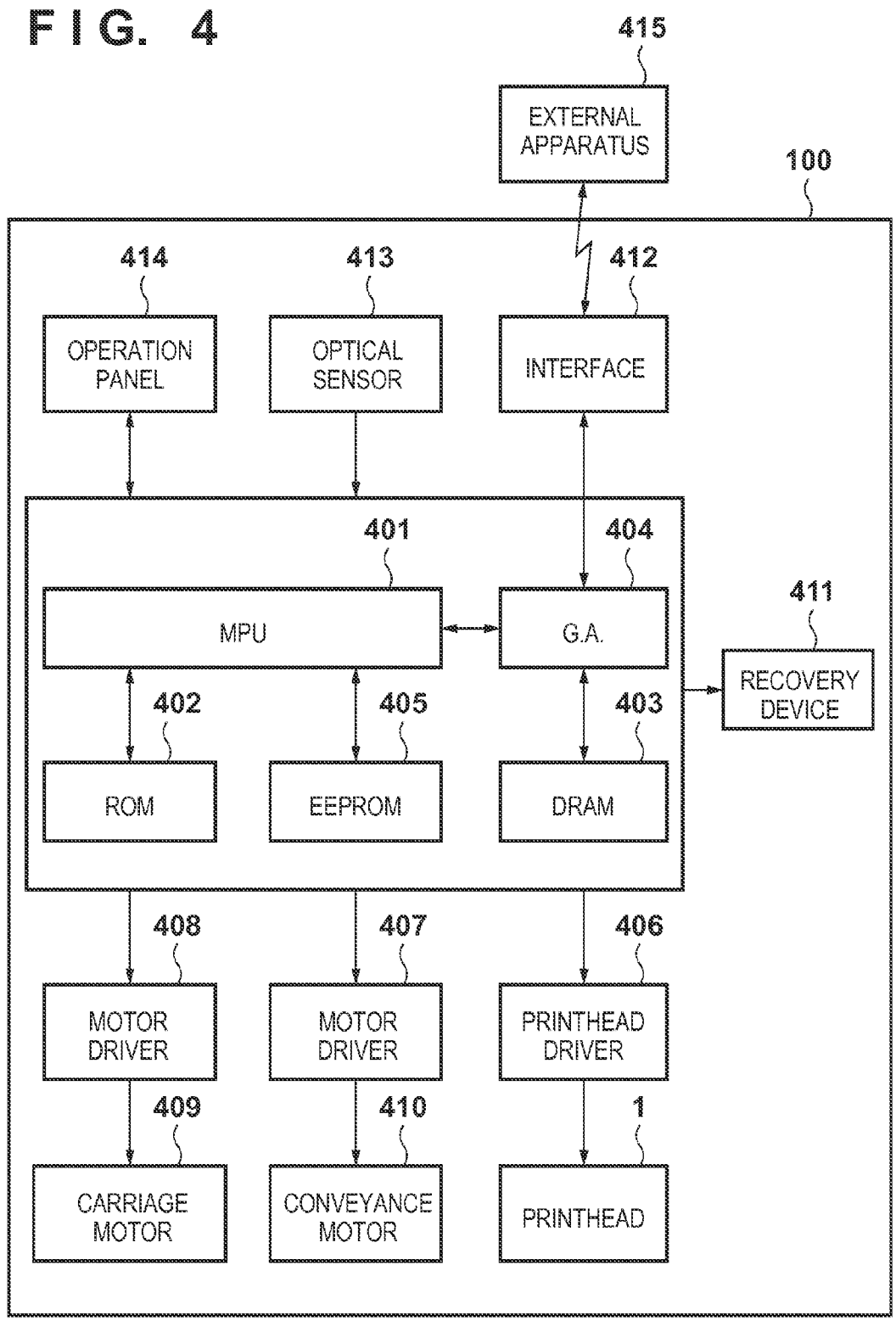
FIG. 4 is a block diagram showing the arrangement of the control system of the inkjet printing apparatus.

FIG. 4 is a block diagram showing the arrangement of the control system of the inkjet printing apparatus 100. The inkjet printing apparatus 100 receives command data such as a print job, image data to be printed, and the like via an interface 412 from an external apparatus 415 serving as a general-purpose information processing apparatus such as a PC. The inkjet printing apparatus 100 can transmit, to the external apparatus 415 via the interface 412, status information representing an apparatus state such as the progress of job processing in the inkjet printing apparatus 100, the error state, or the power supply state. An MPU 401 controls respective units in the inkjet printing apparatus 100 by executing control programs and necessary data stored in a ROM 402, thereby implementing an operation according to the embodiment.

A DRAM 403 stores various data including print data for discharging an ink droplet from the printhead. A gate array 404 controls data transfer between the interface 412, the MPU 401, and the DRAM 403. The gate array 404 also controls supply of print data to the printhead 1. An EEPROM 405 is a nonvolatile memory capable of storing data which needs to be saved even upon power-off of the inkjet printing apparatus 100.

A carriage motor 409 reciprocates the carriage 3 in the scanning directions shown in FIG. 1. A conveyance motor 410 conveys the printing medium 2. A printhead driver 406 drives the printhead 1 in order to discharge ink droplets and print an image or the like. Motor drivers 407 and 408 drive the conveyance motor 410 and carriage motor 409, respectively. A recovery device 411 includes the above-described cap, pump, and the like. An operation panel 414 includes a setting input unit used by a user such as an operator to make various settings for the inkjet printing apparatus 100, and a display unit which displays setting menus and various messages such as a warning. The setting input unit includes hardware keys such as a cross key, and software keys on a touch panel or the like. The display unit includes various displays such as an LCD.

In the embodiment, whether the discharge state is normal discharge or one of various discharge failures is determined by detecting a temperature change in the nozzle 201 by the temperature sensor 203 immediately below the discharge heater 202.

Figure 5:
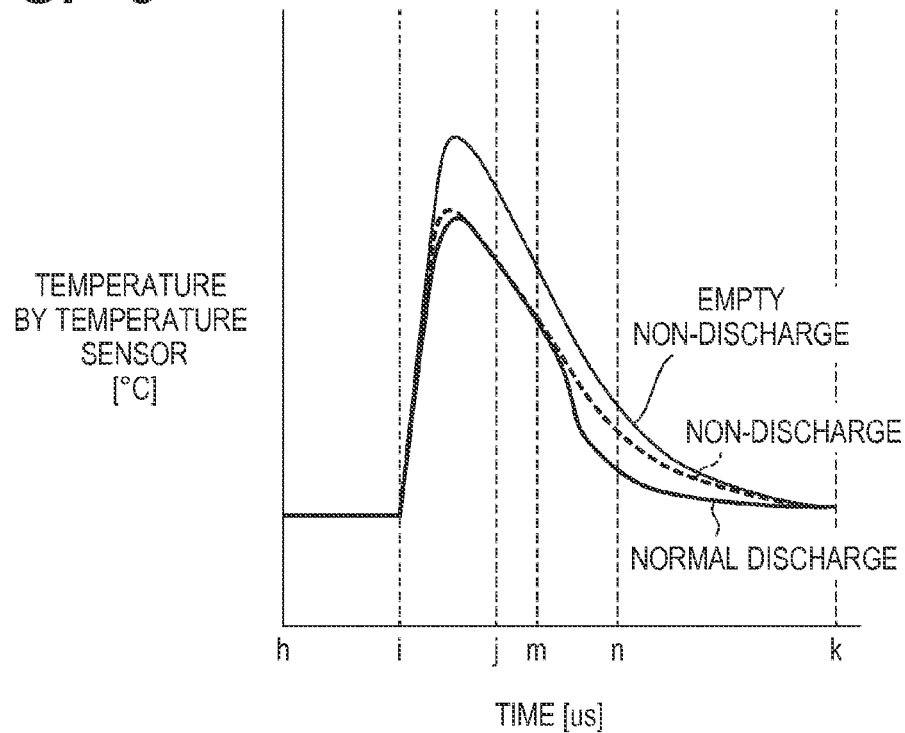
FIG. 5 is a graph showing a temperature change in a nozzle in each discharge state.

FIG. 5 is a graph showing a temperature change in the nozzle 201 in each discharge state. In normal discharge from the nozzle 201, a small droplet generated upon discharge drops on the discharge heater 202. In response to this, heat energy around the temperature sensor 203 moves to the ink droplet, and the temperature detected by the temperature sensor 203 changes abruptly. That is, in normal discharge, the temperature steeply drops near the center of the interval between time m and time n, as represented by a graph corresponding to normal discharge in FIG. 5.

In non-discharge caused by drying of ink in the nozzle 201 or the like, a bubble generated upon heating by the discharge heater 202 remains in the nozzle 201, and the temperature decreases gradually. That is, in non-discharge, the temperature change is more gradual than in normal discharge, as represented by a graph corresponding to non-discharge in FIG. 5. In empty non-discharge in which no ink is filled in the nozzle 201, heat energy applied to the discharge heater 202 is supplied not to ink but to the temperature sensor 203. As a result, the temperature of the temperature sensor 203 becomes higher on the whole than those in normal discharge and non-discharge. The inkjet printing apparatus 100 can determine the discharge state of the nozzle 201 by detecting each temperature change in the nozzle 201 as shown in FIG. 5.

In FIG. 5, the interval between time h and time i represents a temperature change when no voltage is applied to the discharge heater 202. The interval between time i and time j represents a temperature change until the temperature reaches a peak after the voltage is applied to the discharge heater 202. The interval between time j and time k represents a temperature change until the temperature drops to a predetermined temperature with a predetermined time constant after it reaches the peak. For the above-described reason, the maximum temperature and the temperature change in the interval between time j and time k are different in accordance with normal discharge, non-discharge, or empty non-discharge. A point at which the temperature change changes in the interval between time m and time n in normal discharge will be called a temperature drop rate change point.

Figure 6:
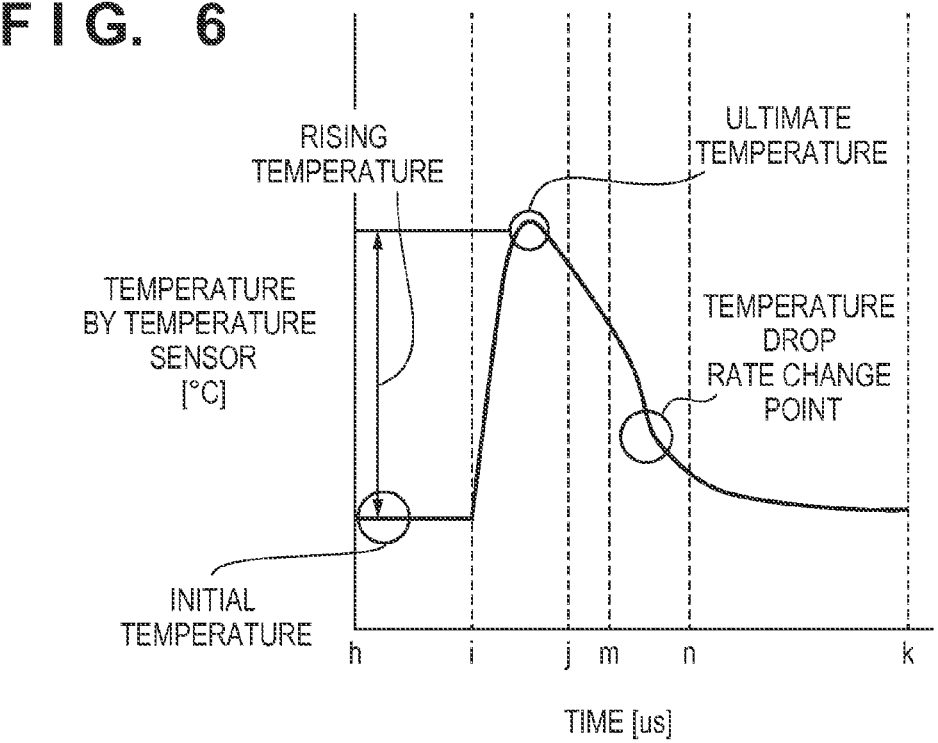
FIG. 6 is a graph for explaining each feature point of a temperature change of the nozzle.

FIG. 6 is a graph for explaining a point representing each feature of a temperature change used to determine the discharge state of the nozzle 201. An initial temperature is a temperature before heating by energizing the discharge heater 202 and applying a voltage. An ultimate temperature is a highest value the temperature reaches after the voltage is applied to the discharge heater 202. A rising temperature is the difference between the initial temperature and the ultimate temperature, and indicates a temperature rise generated by applying a voltage to the discharge heater 202. A temperature drop rate change point is a point at which the rate of the temperature drop changes steeply. As shown in FIG. 6, the temperature drop rate change point is generated in an almost intermediate period between time m and time n.

Based on the feature points as shown in FIG. 6, various characteristics can also be detected in addition to the respective discharge states as shown in FIG. 5. For example, by detecting an initial temperature, the temperature of ink at that time can be estimated. An ink characteristic which influences the image quality, such as viscosity, can be determined from the estimated ink temperature. The surface temperature of the discharge heater 202 can be estimated by detecting an ultimate temperature and rising temperature, and the lifetime of the discharge heater 202 can be estimated from the estimated surface temperature. Since the way of conduction of heat energy from the discharge heater 202 to ink can be estimated from the estimated surface temperature of the discharge heater 202, each discharge state of the nozzle 201 can be detected. Also, contact of an ink droplet to the discharge heater 202 can be detected by detecting a temperature drop rate change point, and the normal discharge state of the nozzle 201 can be detected.

Figure 7:
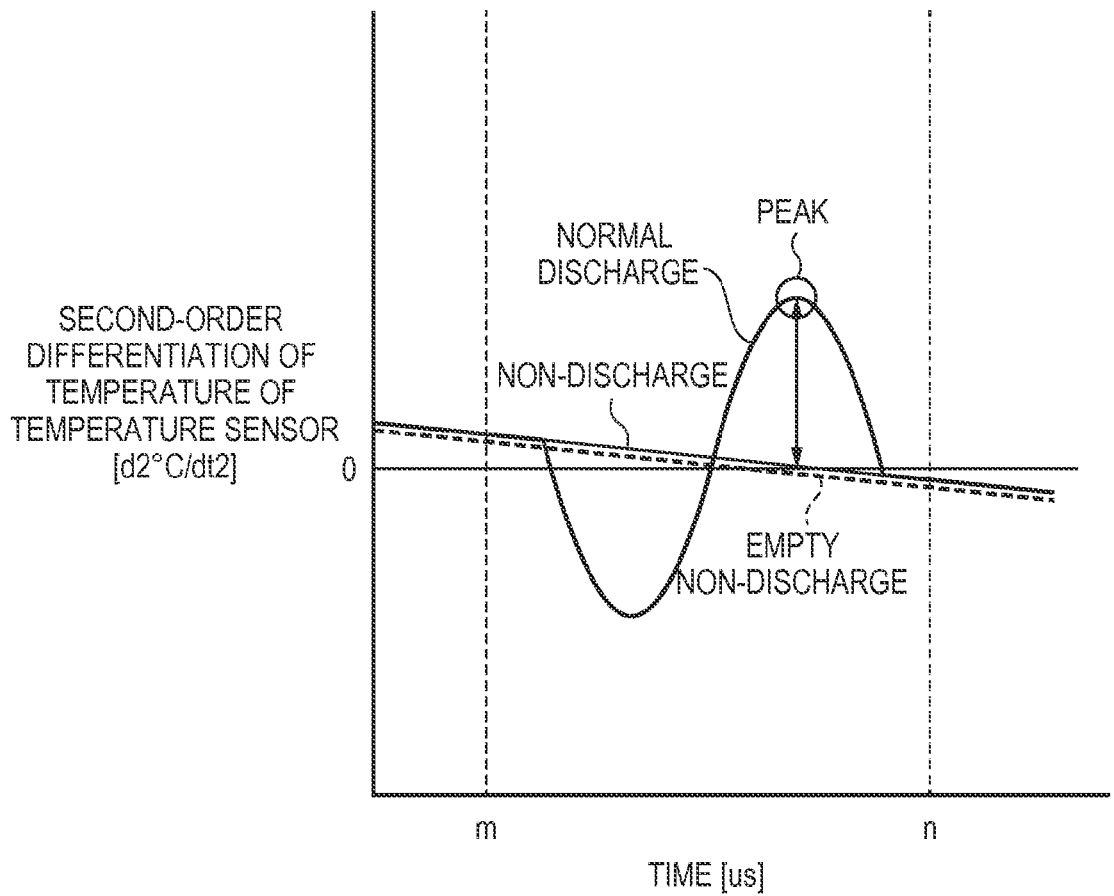
FIG. 7 is a graph showing a waveform obtained by performing second-order differentiation around the temperature drop rate change point.

FIG. 7 is a graph showing, for each discharge state, a waveform obtained by performing second-order differentiation around the temperature drop rate change point in normal discharge shown in FIG. 6. In FIG. 7, m and n correspond to m and n in FIGS. 5 and 6. In the embodiment, to detect a temperature drop rate change point, the peak value of the rate of a temperature change is acquired first by performing second-order differentiation for a temperature change waveform around the temperature drop rate change point (between time m and time n). Then, the peak value (indicated by an arrow in FIG. 7) is compared with a threshold. If the peak value is larger than the threshold, it is determined that the discharge state is normal discharge. If the peak value is equal to or smaller than the threshold, it is determined that the discharge state is non-discharge or empty non-discharge.

In the embodiment, the temperature sensor 203 is, for example, a thin-film resistance sensor whose resistance value changes in accordance with the temperature change. By supplying a constant current to the temperature sensor 203, a change of the resistance value of the temperature sensor 203 is detected as a voltage change. That is, the output voltage of the temperature sensor 203 changes in accordance with a temperature change of the heater.

Figure 8:
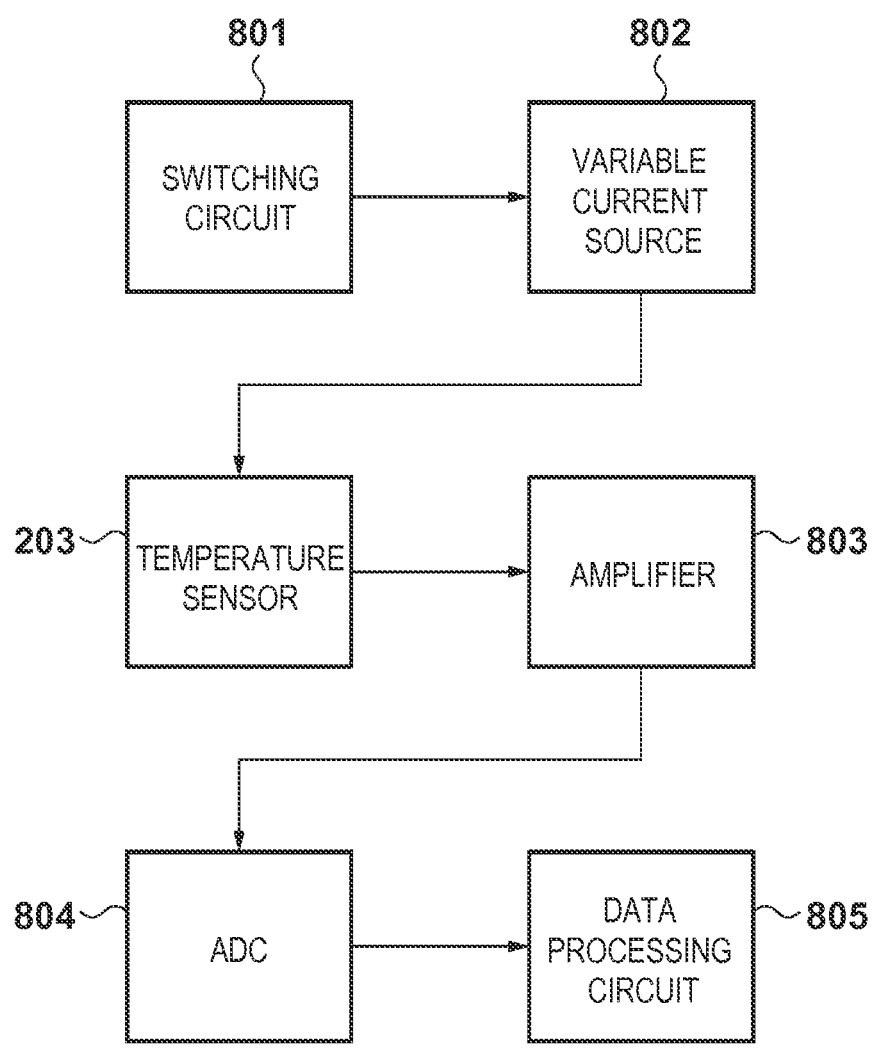
FIG. 8 is a block diagram showing the arrangement of functional blocks around the temperature sensor.

FIG. 8 is a block diagram showing the arrangement of functional blocks around the temperature sensor 203. A switching circuit 801 controls a variable current source 802 capable of supplying constant currents of a plurality of current values, to supply, to the temperature sensor 203, a constant current of a current value set by the switching circuit 801. The variable current source 802 can supply a constant current of the first constant current value, and a constant current of the second constant current value larger than the first constant current value. A constant current supplied to the temperature sensor 203 will also be called a sensor current. In the following description, the variable current source 802 can switch the sensor current value between 3.0 mA and 4.5 mA. Upon a change of the resistance value of the temperature sensor 203, the temperature sensor 203 outputs a voltage change corresponding to the current value of a supplied constant current. The voltage change output from the temperature sensor 203 is amplified by an amplifier 803 and digitized by an analog-to-digital converter (ADC) 804. A data processing circuit 805 extracts each feature point in FIG. 6 from the digital voltage change of the temperature sensor 203, and determines each discharge state. When determining each discharge state, acquisition of a peak value and comparison with a threshold, which have been described with reference to FIG. 7, are performed. The switching circuit 801 and data processing circuit 805 shown in FIG. 8 may be constructed by the MPU 401, an ASIC, or the like.

Figure 9:
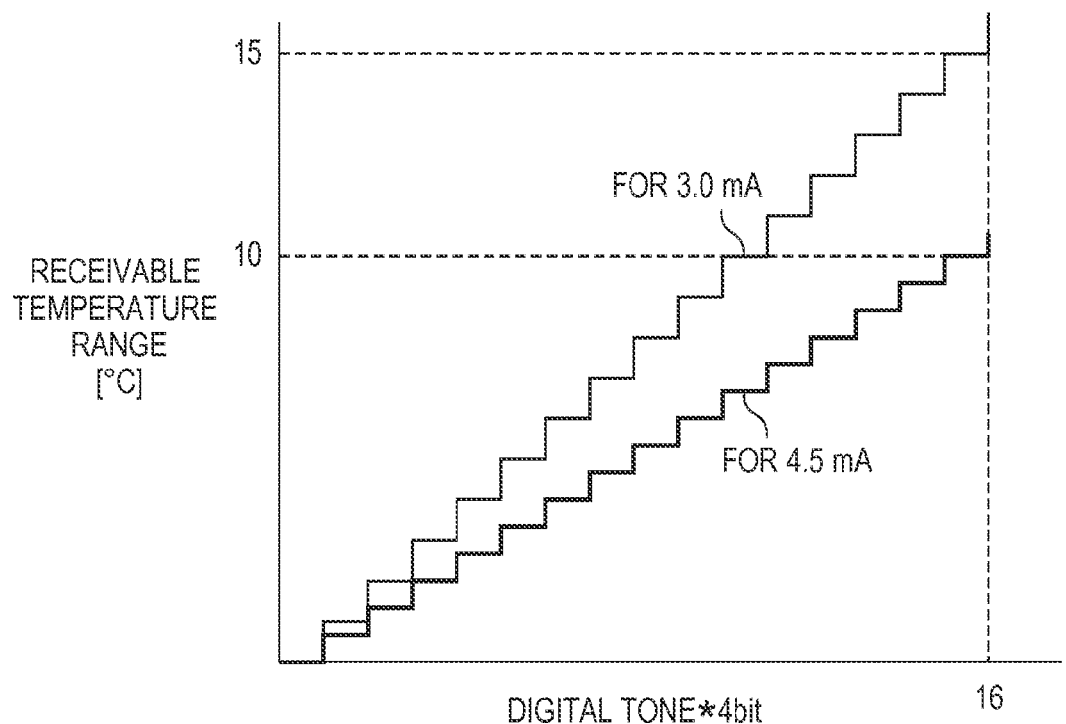
FIG. 9 is a graph showing the relationship between a change of a temperature detected by the temperature sensor and the digital tone.

FIG. 9 is a graph showing the relationship between a change of a temperature detected by the temperature sensor 203 and the digital tone at each sensor current value. In the embodiment, the ADC 804 converts a temperature change into 4-bit data. In other words, 16 tones can be expressed. In FIG. 9, a thin line represents a case in which the sensor current value is 3.0 mA, and a thick line represents a case in which the sensor current value is 4.5 mA.

In general, when the sensor current value is smaller, an output temperature change becomes smaller, and the ADC 804 can receive a wider temperature range. To the contrary, when the sensor current value is larger, an output temperature change becomes larger, and the temperature range receivable by the ADC 804 becomes narrower. As shown in FIG. 9, the upper limit of the temperature range receivable when the sensor current value is 3.0 mA is 15° C., and the upper limit of the temperature range receivable when the sensor current value is 4.5 mA is 10° C. Therefore, the resolution of the ADC 804 becomes 0.94° C./tone when the sensor current is 3.0 mA, and 0.63° C./tone when the sensor current is 4.5 mA. That is, when the sensor current value is 4.5 mA, the receivable temperature range becomes narrower than that when the sensor current value is 3.0 mA, but a temperature change can be detected at high resolution.

Figure 10:
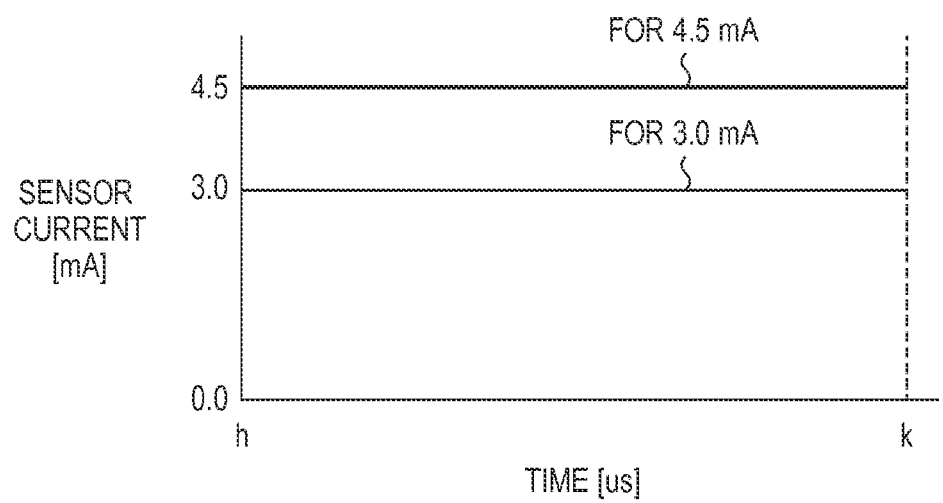
FIG. 10 is a graph showing a temporal change of a sensor current value supplied to the temperature sensor.

FIG. 10 is a graph showing a temporal change of the sensor current value supplied to the temperature sensor 203. In FIG. 10, the interval between time h and time k corresponds to the interval between time h and time k in FIGS. 5 and 6. This represents that constant currents (3.0 mA and 4.5 mA) are always supplied to the temperature sensor 203 in the interval between time h and time k.

Figure 11:
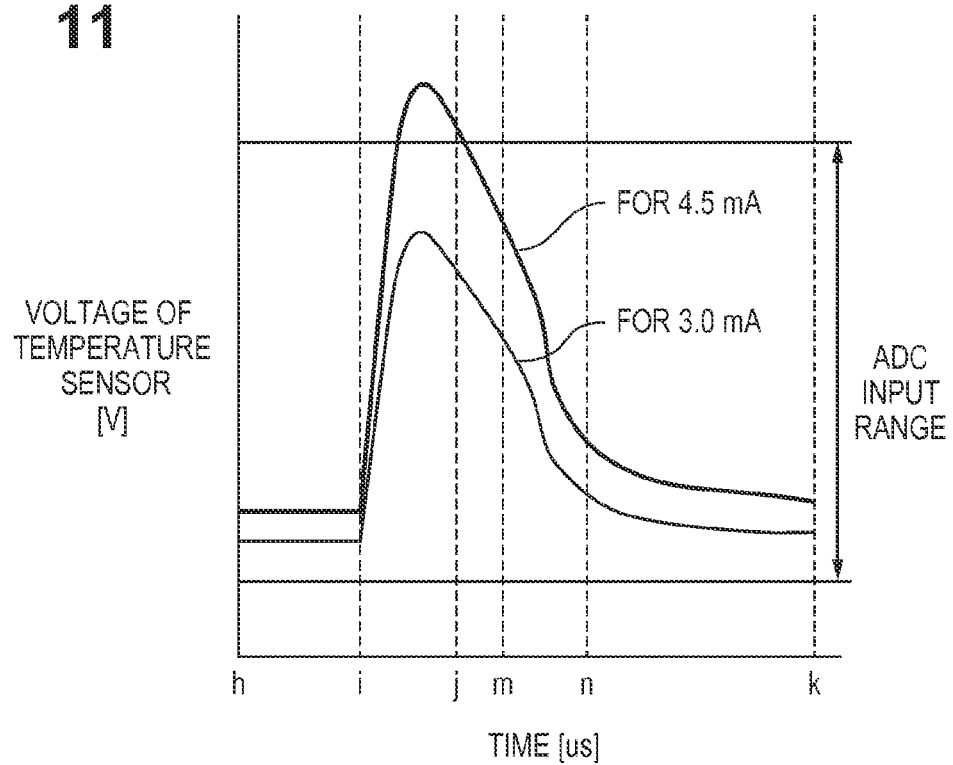
FIG. 11 is a graph showing a change of the output voltage of the temperature sensor at each sensor current in FIG. 10.

FIG. 11 is a graph showing a change of the output voltage of the temperature sensor 203 when each sensor current as shown in FIG. 10 is supplied to the temperature sensor 203. As shown in FIG. 11, when the sensor current value is 3.0 mA, the entire range from the initial temperature to the ultimate temperature can fall within the input range of the ADC 804. However, a voltage change upon a temperature change at the temperature drop rate change point becomes small. In contrast, when the sensor current value is 4.5 mA, the entire range from the initial temperature to the ultimate temperature cannot fall within the input range of the ADC 804. However, a voltage change upon a temperature change at the temperature drop rate change point becomes large.

Figure 12:
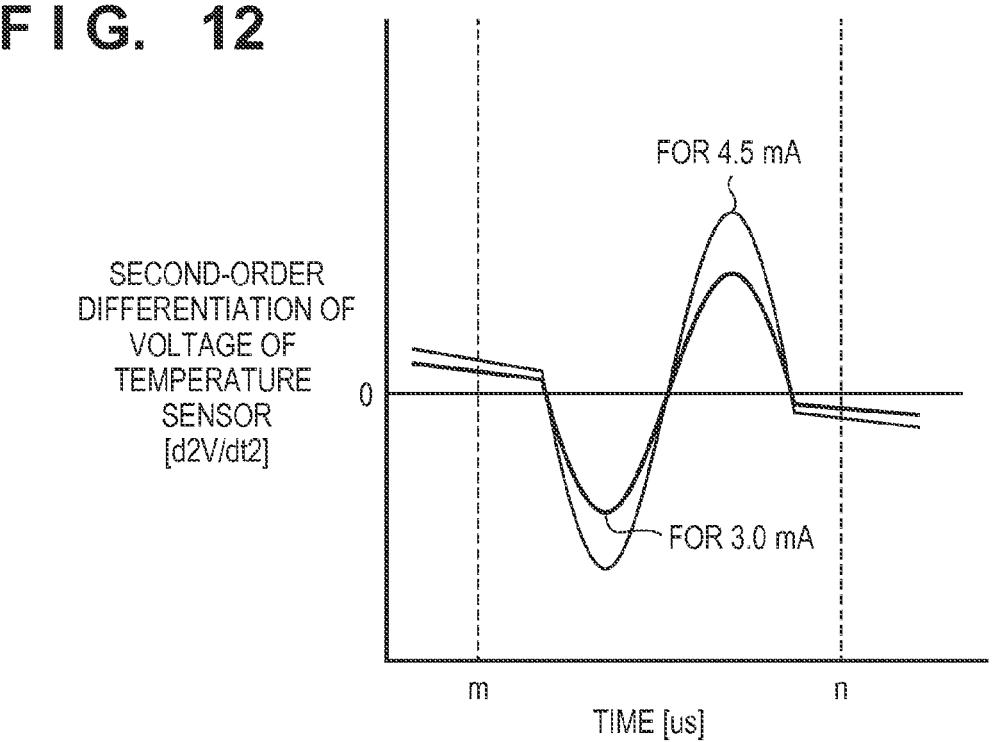
FIG. 12 is a graph showing a waveform obtained by performing second-order differentiation for a waveform around the temperature drop rate change point in FIG. 11.

FIG. 12 is a graph showing, for each sensor current value, a waveform obtained by performing second-order differentiation for a waveform around the temperature drop rate change point in FIG. 11. In FIG. 12, the interval between time m and time n corresponds to the interval between time m and time n in FIGS. 5 and 6. As shown in FIG. 12, the peak value obtained when the sensor current value is 4.5 mA is larger than the peak value obtained when it is 3.0 mA.

Figure 13A:
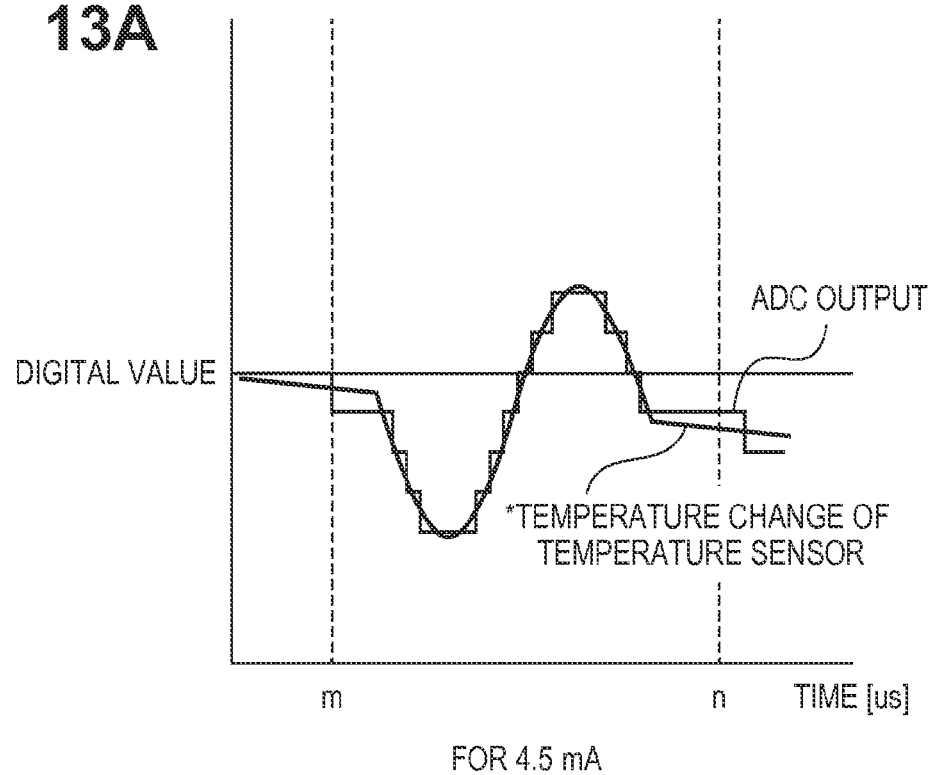
FIGS. 13A and 13B are graphs showing the correspondence between a temperature change of the temperature sensor and a change of a digital value.
Figure 13B:
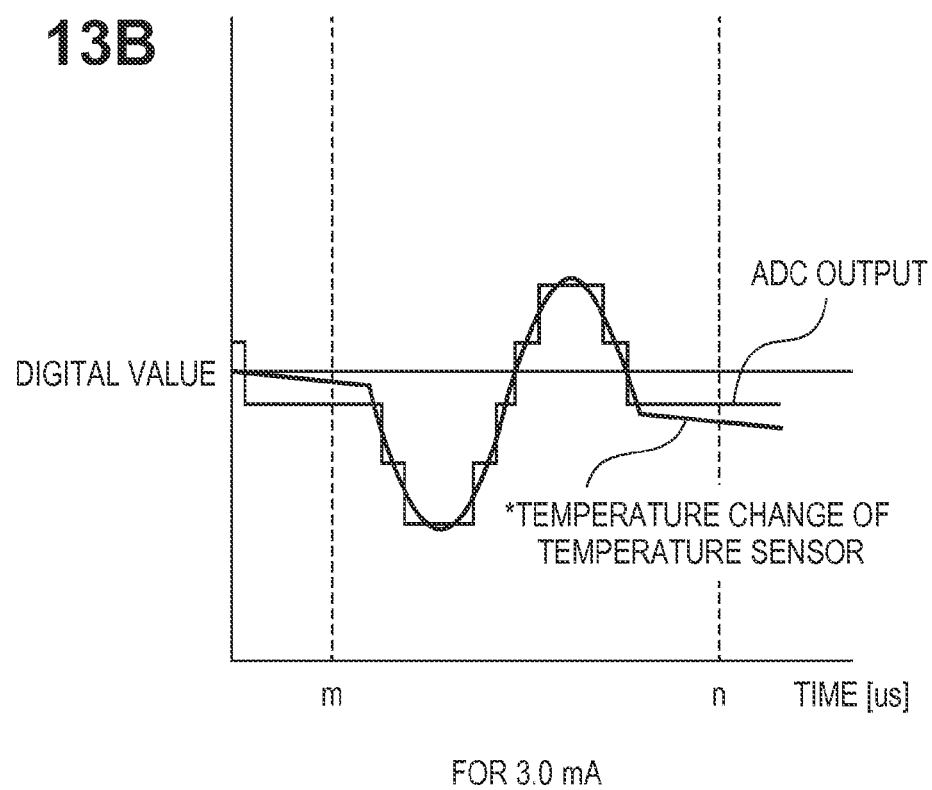

FIGS. 13A and 13B are graphs showing the correspondence between a temperature change (second-order differentiation) of the temperature sensor 203 and a change of a digital value output from the ADC 804. In FIGS. 13A and 13B, the interval between time m and time n corresponds to the interval between time m and time n in FIGS. 5 and 6. As described with reference to FIG. 9, as the sensor current value becomes larger, a voltage change upon a temperature change of the temperature sensor becomes larger. When the sensor current value is 4.5 mA, the resolution for a temperature change of the temperature sensor 203 becomes higher than that when the sensor current value is 3.0 mA. Hence, an output from the ADC 804 upon a temperature change of the temperature sensor 203 can be detected at higher accuracy.

Figure 14:
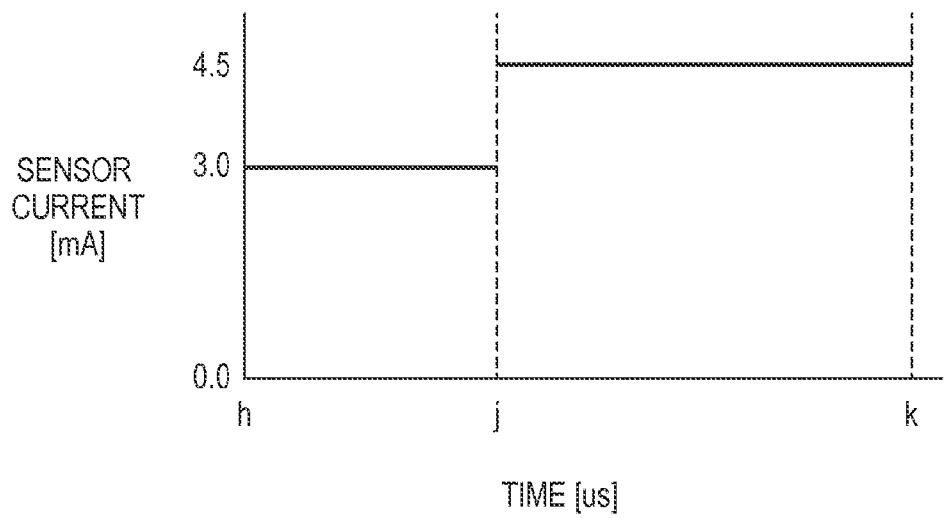
FIG. 14 is a graph showing a temporal change of the sensor current value supplied to the temperature sensor.

FIG. 14 is a graph showing a temporal change of the sensor current value supplied to the temperature sensor 203. In FIG. 14, the intervals between time h, time j, and time k correspond to the intervals between time h, time j, and time k in FIGS. 5 and 6. As shown in FIG. 14, the sensor current value is set to be 3.0 mA in the interval between time h and time j, and 4.5 mA in the interval between time j and time k.

Figure 15:
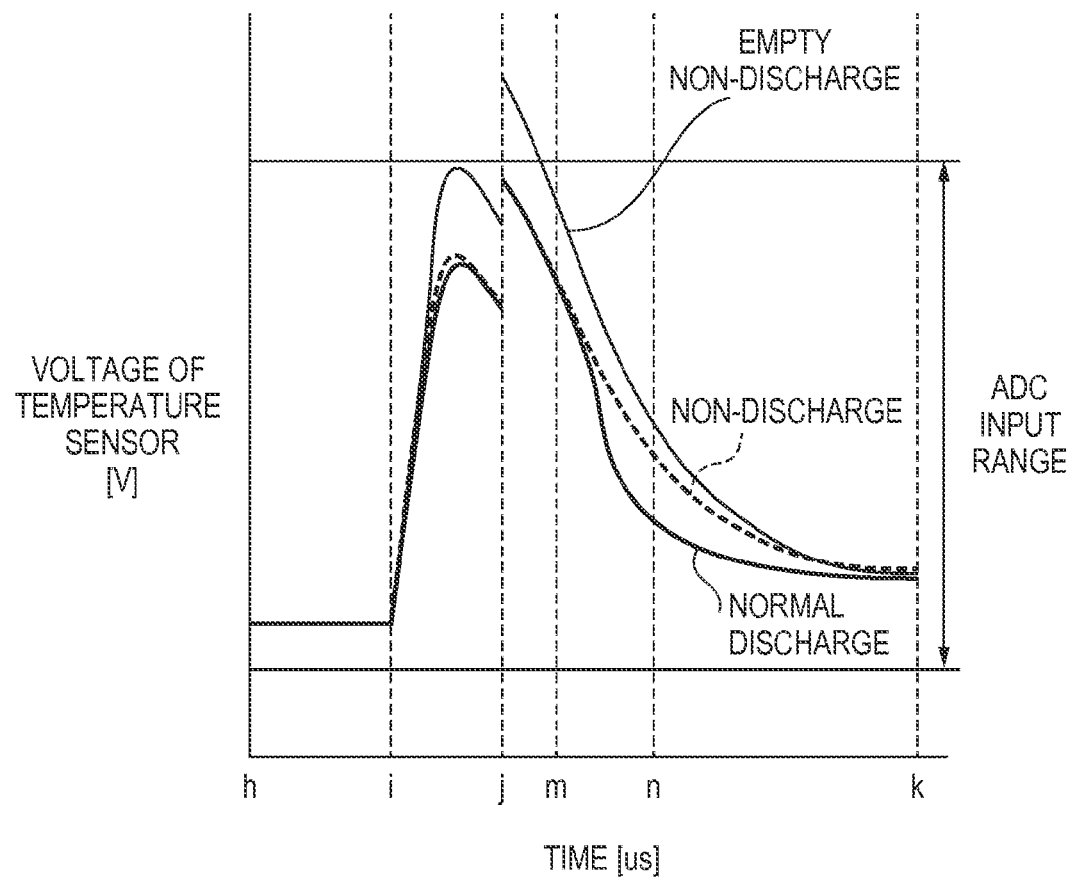
FIG. 15 is a graph showing a change of the output voltage of the temperature sensor at each sensor current in FIG. 14.

FIG. 15 is a graph showing a change of the output voltage of the temperature sensor 203 when each sensor current as shown in FIG. 14 is supplied to the temperature sensor 203. As shown in FIG. 15, since the sensor current value is set to be 3.0 mA in the interval between time h and time j, the entire range from the initial temperature to the ultimate temperature can fall within the input range of the ADC 804. To the contrary, since the sensor current value is set to be 4.5 mA in the interval between time j and time k, a temperature range falling outside the input range of the ADC 804 is generated. However, an output voltage change upon a temperature change around the temperature drop rate change point becomes larger than that when the sensor current value is set to be 3.0 mA. This can improve the detection accuracy of the temperature drop rate change point and the determination accuracy of the discharge state of the nozzle 201.

As described above, the sensor current value is changed between the section from the initial temperature to the ultimate temperature and the section after the ultimate temperature. As a result, detection omission of the ultimate temperature can be prevented, and the detection accuracy of the temperature drop rate change point can be improved.

[Second Embodiment]

The first embodiment aims to prevent detection omission of the ultimate temperature and improve the detection accuracy of the temperature drop rate change point. However, when there is no fear of detection omission of the temperature drop rate change point, it may be aimed to receive the entire range of a detected temperature, and a larger sensor current value may be used for only a portion at which a voltage change of a temperature sensor 203 needs to be detected at high accuracy.

Figure 16:
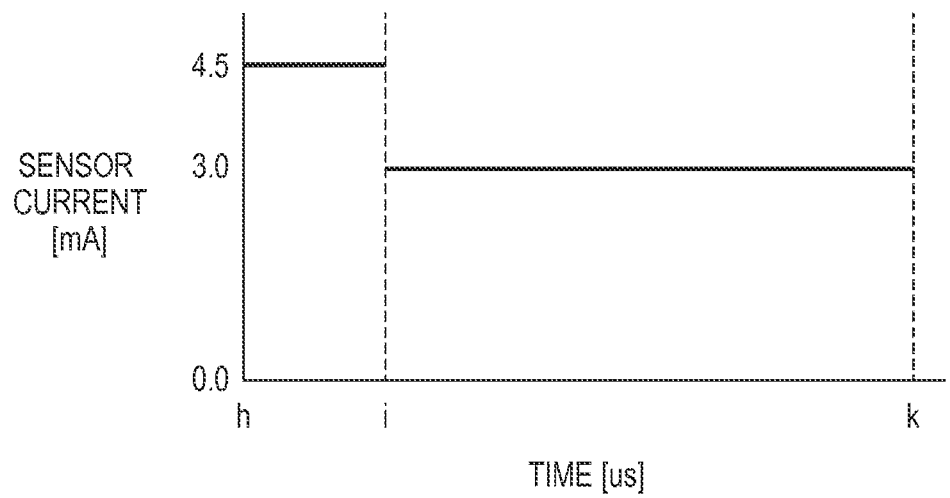
FIG. 16 is a graph showing a temporal change of the sensor current value supplied to the temperature sensor.

FIG. 16 is a graph showing a temporal change of the sensor current value supplied to the temperature sensor 203. In FIG. 16, the intervals between time h, time i, and time k correspond to the intervals between time h, time i, and time k in FIGS. 5 and 6. As shown in FIG. 16, the sensor current value is set to be 4.5 mA in the interval between time h and time i, and 3.0 mA in the interval between time i and time k.

Figure 17:
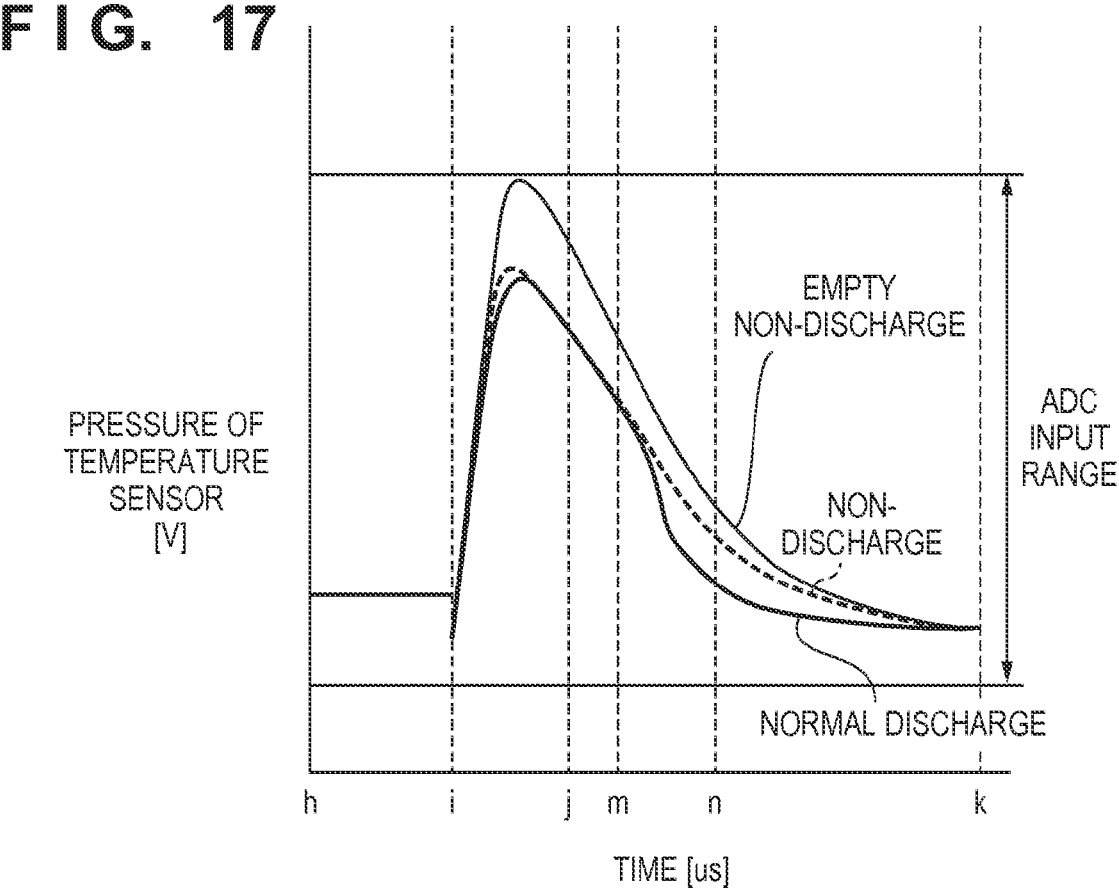
FIG. 17 is a graph showing a change of the output voltage of the temperature sensor at each sensor current in FIG. 16.

FIG. 17 is a graph showing a change of the output voltage of the temperature sensor 203 when each sensor current as shown in FIG. 16 is supplied to the temperature sensor 203. As shown in FIG. 17, since the sensor current value is set to be 4.5 mA in the interval between time h and time i, a change of the sensor voltage upon a change of the initial temperature can be made larger than that when the sensor current value is 3.0 mA. Since the sensor current value is set to be 3.0 mA in the interval between time i and time k, both the ultimate temperature and a voltage change at the temperature drop rate change point can fall within the input range of an ADC 804.

As described above, the sensor current value is changed between the initial temperature section, and the rising temperature section and subsequent sections. This can increase a change of the sensor voltage upon a change of the initial temperature to improve the detection accuracy. In addition, detection omission of the ultimate temperature and temperature drop rate change point can be prevented.

[Third Embodiment]

FIG. 18 is a graph showing a temporal change of the sensor current value supplied to a temperature sensor 203. In FIG. 18, the intervals between time h, time i, time j, and time k correspond to the intervals between time h, time i, time j, and time k in FIGS. 5 and 6. As shown in FIG. 18, the sensor current value is set to be 4.5 mA in the interval between time h and time i and the interval between time j and time k, and 3.0 mA in the interval between time i and time j.

FIG. 19 is a graph showing a change of the output voltage of the temperature sensor 203 when each sensor current as shown in FIG. 18 is supplied to the temperature sensor 203. As shown in FIG. 19, since the sensor current value is set to be 4.5 mA in the interval between time h and time i, a change of the sensor voltage upon a change of the initial temperature can be made larger than that when the sensor current value is 3.0 mA. Also, since the sensor current value is set to be 4.5 mA in the interval between time j and time k, a change of the sensor voltage upon a temperature change at the temperature drop rate change point can be made larger than that when the sensor current value is 3.0 mA. Since the sensor current value is set to be 3.0 mA in the interval between time i and time j, the ultimate temperature can fall within the input range of an ADC 804.

As described above, the sensor current value is changed between the initial temperature section, the section from the rising temperature to the ultimate temperature, and the vicinity of the temperature drop rate change point. This can increase a change of the sensor voltage upon a change of the initial temperature and a temperature change at the temperature drop rate change point, improving the detection accuracy. Further, detection omission of the ultimate temperature can be prevented.

The above-described embodiments have explained feature points as the initial temperature, ultimate temperature, rising temperature, and temperature drop rate change point. However, other feature points may be set in accordance with a temperature change accompanying the shapes and driving methods of the nozzle 201 and discharge heater 202, or a manufacturing error such as resistance variations of the temperature sensor 203. Similarly, in accordance with one of them, the discharge state determination method based on the sensor current value switching timing, the magnitude of a current value, the magnitude of a change of the waveform, and the presence/absence of a peak value may also be decided.

The above-described discharge state determination method may be performed for all nozzles at appropriate timings. For example, the discharge state determination processing may be performed during the printing operation or at the time of preliminary discharge. In any case, the discharge state determination processing is executed along with the discharge operation of each nozzle, so a discharge failure nozzle can be specified at high accuracy. Upon detecting a discharge failure nozzle, recovery processing by the recovery device 411, and complementary processing for complementing printing with another normal discharge nozzle can be executed quickly. Further, decision of an optimal driving pulse, protection processing of the printhead 1 from an inevitable temperature rise, display of a warning on the operation panel 414 to the user, and the like can be executed quickly.

The above-described embodiments have explained the inkjet printing apparatus 100 including a serial printhead as shown in FIG. 1. However, each embodiment can be implemented even in an inkjet printing apparatus including a so-called line printhead in which nozzles are arrayed in a range corresponding to the entire width of a printing medium. The inkjet printing apparatus including the line printhead can perform the printing operation at high speed. However, the inkjet printing apparatus of this type can neither locate the printhead at the position of the recovery device during the printing operation, nor perform recovery processing, unlike the serial printhead. By the operation in each embodiment, however, a nozzle in which a discharge failure has occurred can be quickly specified during preliminary discharge to the cap or during the printing operation, and complementary processing of printing by another normal discharge nozzle can be performed quickly.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-067127, filed Mar. 27, 2013, which is hereby incorporated by reference herein in its entirety.

What is claimed is:

1. An inkjet printing apparatus comprising:
   a printhead including a heater configured to discharge an ink droplet from a nozzle, and a resistance sensor whose resistance value changes upon a temperature change of the heater;
   a current source configured to be able to supply, to the resistance sensor, a constant current of a first constant current value and a constant current of a second constant current value larger than the first constant current value; and
   a detection unit configured to detect a change of the resistance value of the resistance sensor by switching a value of the constant current to be supplied to the resistance sensor between the first constant current value and the second constant current value a predetermined time after driving the heater to discharge the ink droplet.

2. The apparatus according to claim 1, further comprising a determination unit configured to determine a discharge state of the ink droplet of the nozzle based on the change of the resistance value of the resistance sensor that has been detected by said detection unit.

3. The apparatus according to claim 2, wherein said determination unit determines the discharge state of the ink droplet of the nozzle based on a change of the resistance value of the resistance sensor to which the constant current of the second constant current value is supplied.

4. The apparatus according to claim 1, wherein a period during which the constant current of the second constant current value is supplied corresponds to a period during which a temperature of the heater drops to a predetermined temperature after reaching a peak.

5. An inkjet printing apparatus including a printhead including a heater configured to discharge an ink droplet from a nozzle, and a sensor whose output voltage changes upon a temperature change of the heater, comprising:
- a current source configured to be able to supply, to the sensor, a constant current of a first constant current value and a constant current of a second constant current value larger than the first constant current value; and
- a detection unit configured to detect a change of the output voltage of the sensor by switching a value of the constant current to be supplied to the sensor between the first constant current value and the second constant current value a predetermined time after driving the heater to discharge the ink droplet.

6. The apparatus according to claim 5, further comprising a determination unit configured to determine a discharge state of the ink droplet of the nozzle based on the change of the output voltage of the sensor that has been detected by said detection unit.

7. The apparatus according to claim 6, wherein said determination unit determines the discharge state of the ink droplet of the nozzle based on a change of the output voltage of the sensor to which the constant current of the second constant current value is supplied.

8. The apparatus according to claim 5, wherein a period during which the constant current of the second constant current value is supplied corresponds to a period during which a temperature of the heater drops to a predetermined temperature after reaching a peak.

* * * * *